(12) United States Patent
Tjader

(10) Patent No.: US 7,698,974 B2
(45) Date of Patent: Apr. 20, 2010

(54) METHOD AND DEVICE FOR PIPE SPLITTING

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

(21) Appl. No.: 12/204,329

(22) Filed: Sep. 4, 2008

(65) Prior Publication Data

US 2008/0317554 A1 Dec. 25, 2008

Related U.S. Application Data

(62) Division of application No. 11/122,972, filed on May 5, 2005, now Pat. No. 7,434,315.

(60) Provisional application No. 60/568,159, filed on May 5, 2004.

(51) Int. Cl.
B26D 1/143 (2006.01)
B23D 21/06 (2006.01)

(52) U.S. Cl. ................... 83/13; 30/92.5; 30/103; 166/55.2; 405/156

(58) Field of Classification Search .............. 30/92, 30/92.5, 93, 103; 405/156; 166/55.2; 83/13
See application file for complete search history.

(56) References Cited

U.S. PATENT DOCUMENTS

| 2,638,320 | A | 5/1953 | Condra |
| 2,896,669 | A | 7/1959 | Broadway et al. |
| 2,942,092 | A | 6/1960 | Cammann |
| 3,181,302 | A | 5/1965 | Lindsay |
| 4,903,406 | A | 2/1990 | Schosek et al. |
| 5,171,106 | A | 12/1992 | Rockower et al. |
| 5,439,320 | A | 8/1995 | Abrams |
| 5,445,222 | A | 8/1995 | Pritchard et al. |
| RE35,542 | E | 6/1997 | Fisk et al. |
| 6,793,442 | B2 | 9/2004 | Carter et al. |
| 7,172,370 | B2 | 2/2007 | Schmidt |
| 7,434,315 | B2* | 10/2008 | Tjader ................. 30/103 |
| 7,448,829 | B2* | 11/2008 | Tjader ............... 405/184.3 |
| 2001/0018007 | A1 | 8/2001 | Puttmann |
| 2003/0084764 | A1 | 5/2003 | Wentworth |
| 2005/0262698 | A1 | 12/2005 | Tjader |
| 2008/0008537 | A1 | 1/2008 | Tjader |
| 2009/0175689 | A1* | 7/2009 | Tjader ............... 405/184.3 |

OTHER PUBLICATIONS

"U.S. Appl. No. 11/122,972 Response to Final Office Action filed May 5, 2008", 12 pgs.

(Continued)

*Primary Examiner*—Hwei-Siu C Payer
(74) *Attorney, Agent, or Firm*—Schwegman Lundberg & Woessner, P.A.

(57) ABSTRACT

A device and method for pipe replacement is shown. A pipe replacement device is shown that includes at least one scoring wheel to provide a more progressive cut that provides consistency in the split of the pipe. A pulling force is reduced using pipe replacement devices and methods in a splitting operation. A pipe replacement device is shown that includes at least one skid structures with a long and consistent profile. In methods shown, friction between a pipe replacement device and the pipe being split is reduced.

18 Claims, 8 Drawing Sheets

OTHER PUBLICATIONS

"U.S. Appl. No. 11/122,972 Response to Non-Final Office Action filed Nov. 21, 2007", 20 pgs.

"U.S. Appl. No. 11/122,972 Final Office Action mailed Mar. 4, 2008", FOAR, 12.

"Non-Final Office Action Mailed Aug. 21, 2007 in U.S. Appl. No. 11/122,972", OARN, 9.

"Restriction Requirement Mailed Jul. 13, 2007 in U.S. Appl. No. 11/122,972", 5 pgs.

" U.S. Appl. No. 11/122,972 Notice of Allowance mailed Jun. 6, 2008", 7pgs.

* cited by examiner

METHOD AND DEVICE FOR PIPE SPLITTING

CROSS REFERENCE TO RELATED APPLICATIONS

This application is a Division of U.S. application Ser. No. 11/122,972, filed on May 5, 2005, now U.S. Pat. No. 7,434,315, which claims the benefit of U.S. Provisional Application Ser. No. 60/568,159, filed on May 5, 2004, which applications are incorporated herein by reference.

TECHNICAL FIELD

This invention relates to devices and methods for pipe replacement. Specifically, this invention relates to ductile pipe material splitters.

BACKGROUND

Pipe such as cast iron, clay or ductile metal pipe has been used for connecting homes and creating networks for utilities such as water, sewer, or gas, etc. As pipes become old, they may crack or break, or for some other reason require replacement.

A technique known as pipe bursting is currently used as a convenient method to replace underground pipe without the need to dig up the pipe to be replaced. A pipe breaking device, such as an expander or a mole, is pulled by a cable through the existing pipe while it is still underground. The expander is designed to break, split or burst the pipe, and at the same time to expand the old pipe into the surrounding soil. The expansion of the old pipe allows the expander to pull a replacement pipe into place.

Pipe splitters typically use one or more cutting wheels to split old ductile pipe material such as ductile iron pipe, or other non-brittle materials. During splitting, the ductile pipe material resists splitting, and frequently stretches or tears. Stretching ductile material also requires large pulling force during a splitting operation.

What is needed is a splitter that provides a more clean and predictable cut. What is also needed is an improved expander design that increases the speed and decreases the power needed during a pipe bursting operation.

DETAILED DESCRIPTION

Figure 1:
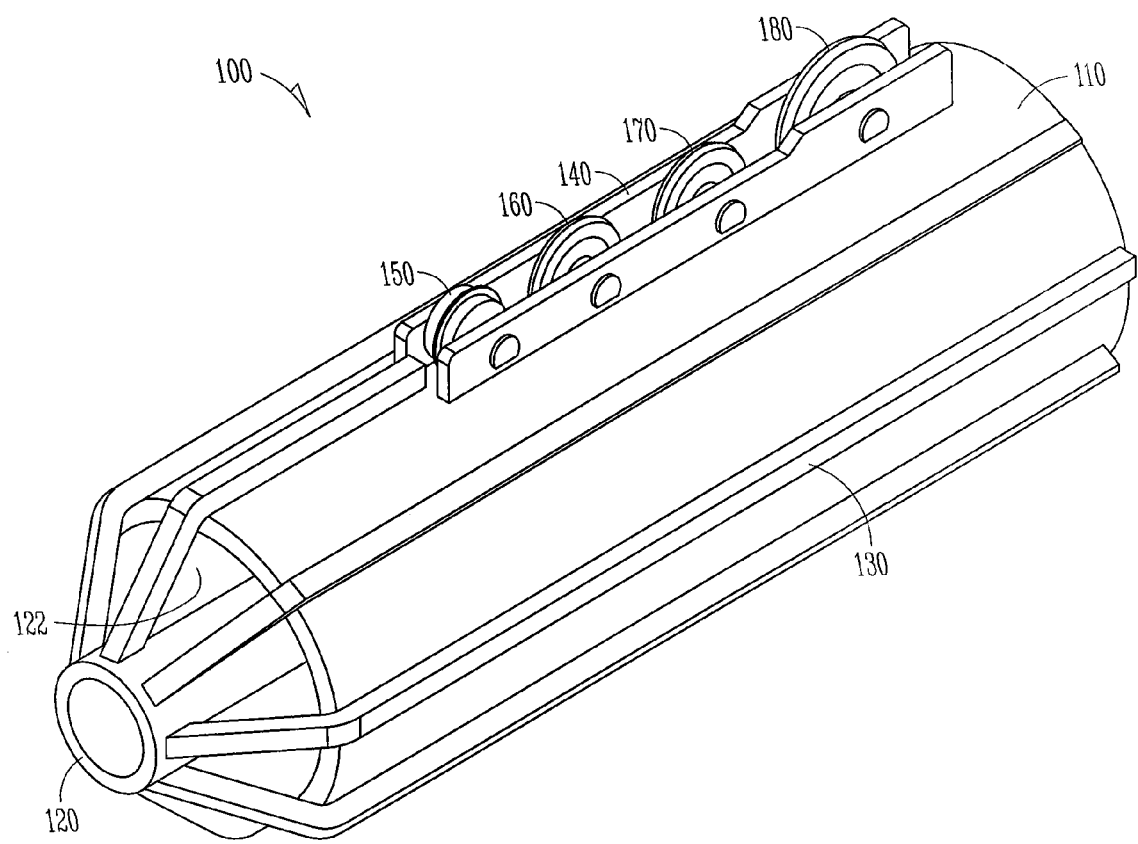
FIG. 1 shows an isometric view of a pipe splitter according to an embodiment of the invention.
Figure 2A:
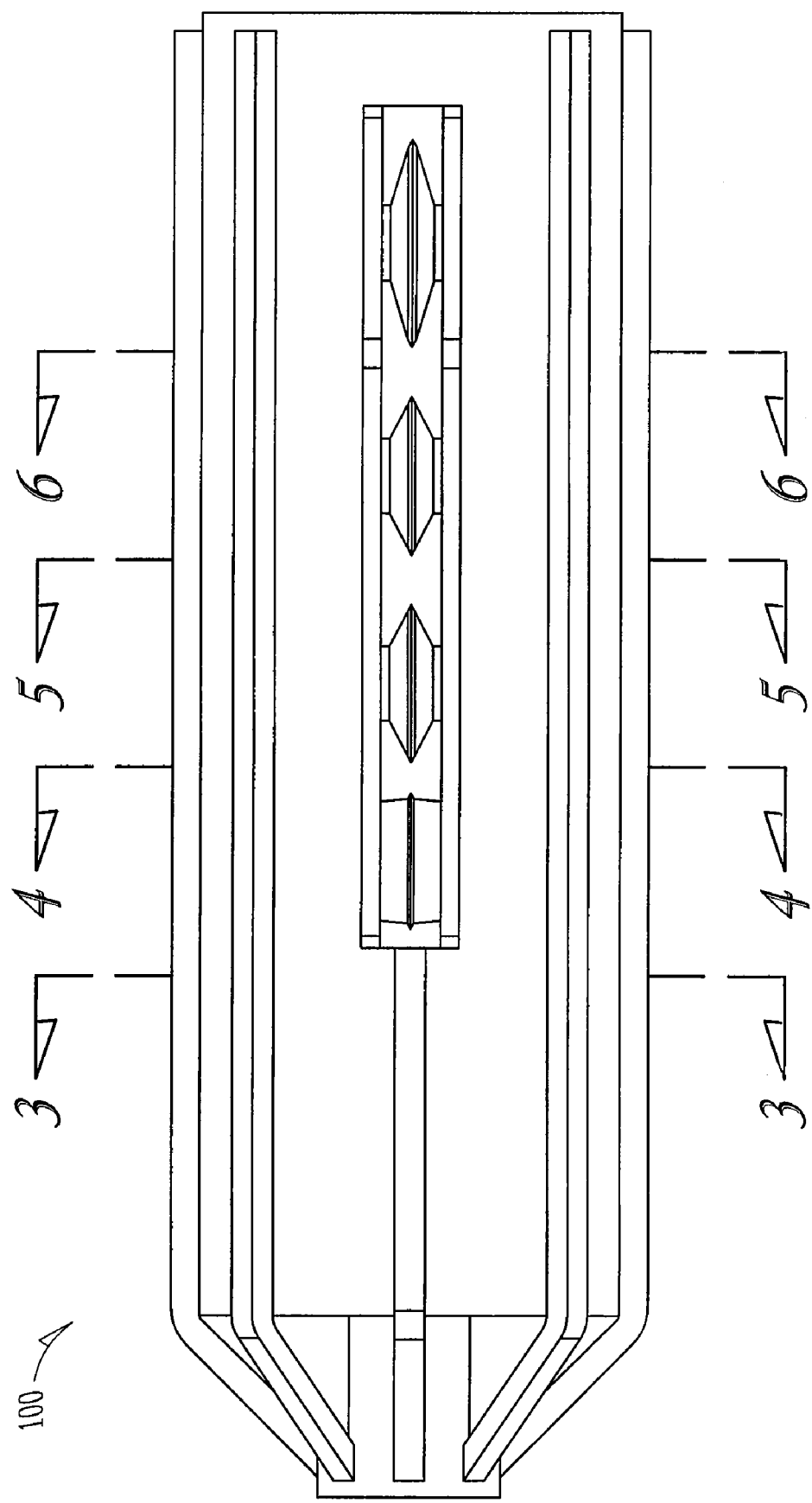
FIG. 2A shows a top view of a pipe splitter according to an embodiment of the invention.
Figure 2B:
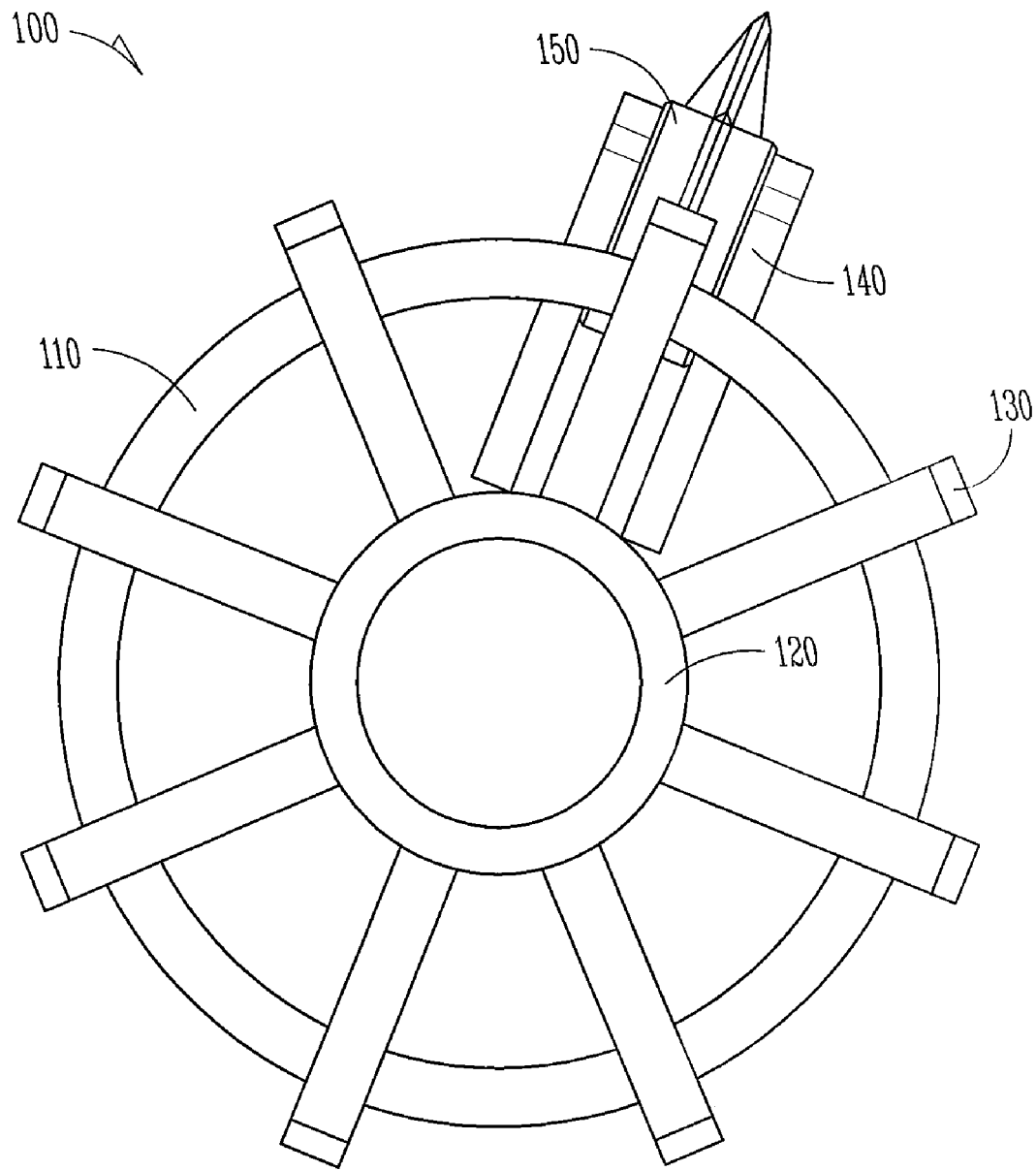
FIG. 2B shows an end view of a pipe splitter according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. In the following description, the term cable is defined to include metal cables, wire rope, or other lengths of material of suitable strength to pull devices as described below through a section of pipe. These embodiments are described in sufficient detail to enable those skilled in the art to practice the invention. Other embodiments may be utilized and structural, or logical changes, etc. may be made without departing from the scope of the present invention.

FIG. 1 shows one embodiment of a pipe splitter 100. In one embodiment, the pipe splitter 100 includes an outer body 110, and an inner body 120, with a number of splined structures 122 coupling the inner body 120 to the outer body 110. In one embodiment, a number of skid structures 130 are coupled to the outside of the outer body 110. Skid structures 130 are used to contact an inner surface of an old pipe to be split. In one embodiment, the skid structures are formed from a material that provides a low coefficient of friction with the pipe to be split. In one embodiment, the skid structures 130 are formed from a steel or other material that is harder than the material of the pipe to be split.

The pipe splitter 100 further includes a cutter assembly 140 including a number of wheels. In one embodiment, the number of wheels are coupled to the cutter assembly by a number of bearings. In FIG. 1, four wheels are shown, however the invention is not so limited. In other embodiments, five wheels or more are used. In one embodiment, fewer than four wheels are used.

Figure 3:
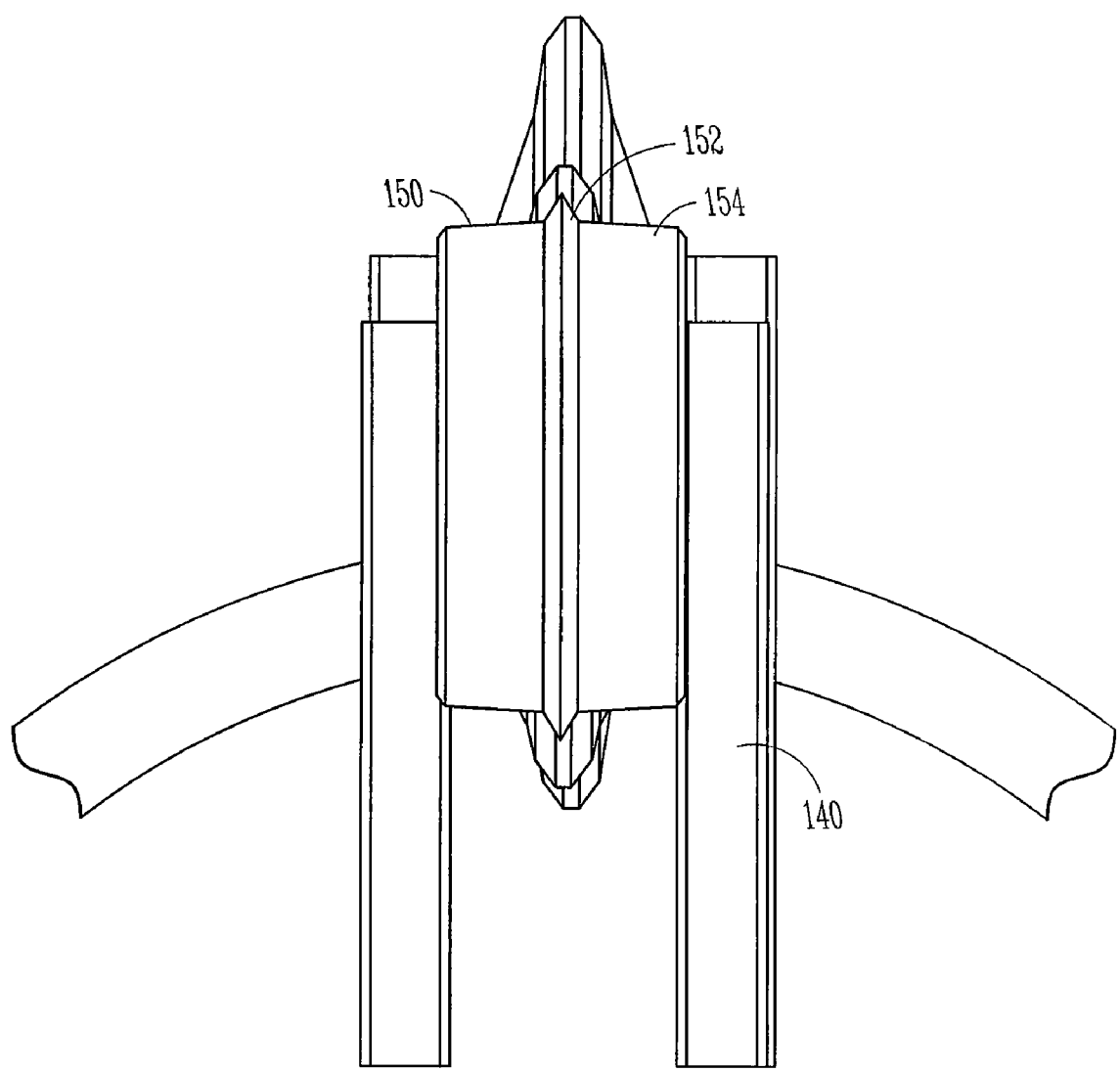
FIG. 3 shows a cross section view along line 3-3 of FIG. 2A according to an embodiment of the invention.
Figure 7:
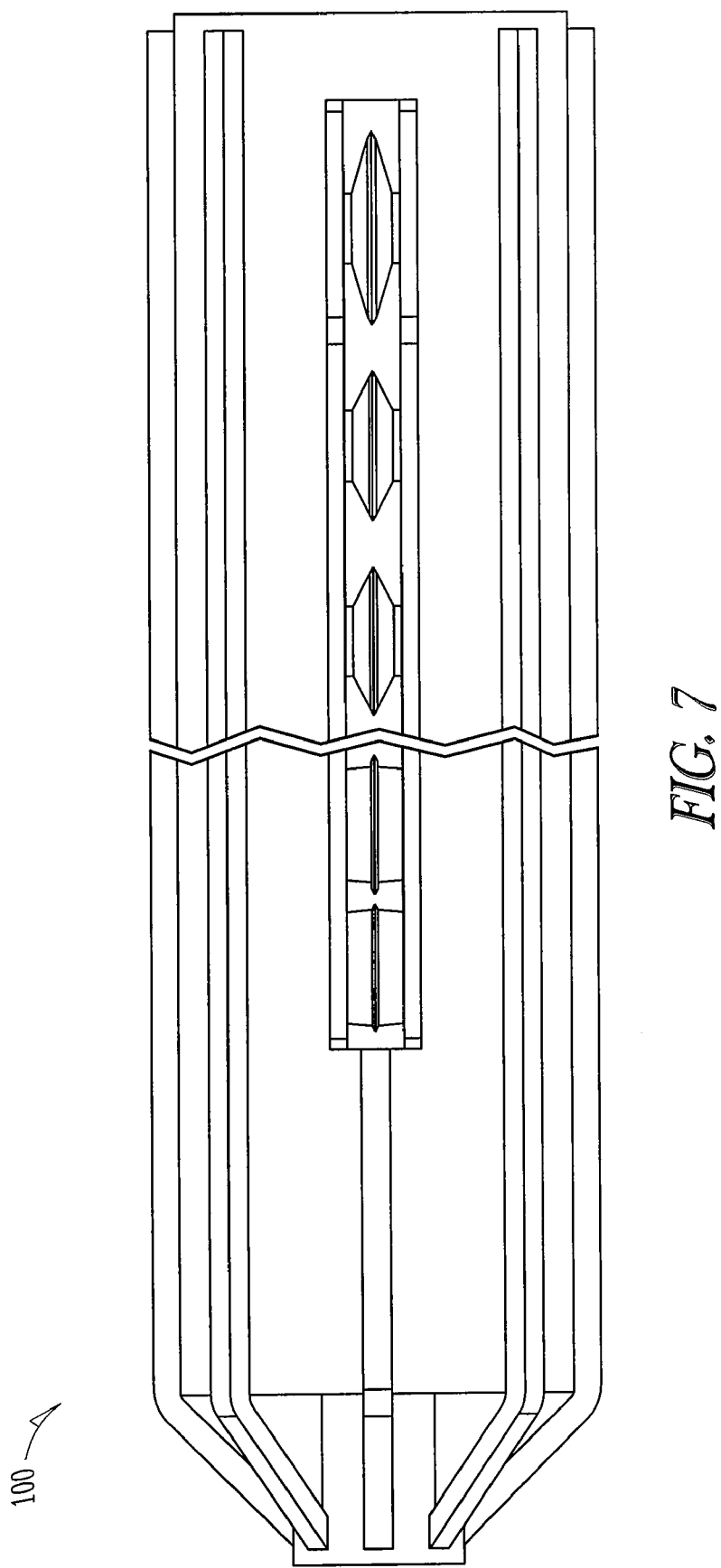
FIG. 7 shows a top view of a pipe splitter according to an embodiment of the invention.

In one embodiment, a first wheel 150 includes a scoring wheel. As shown in FIG. 3, the scoring wheel 150 includes a center sharpened portion 152 and a support portion or shoulder 154. In one example, the shoulder 154 extends outwardly from the sharpened portion 152 in a direction generally parallel to an axis of rotation of the scoring wheel 150. In one example, at least a portion of the shoulder 154 is disposed above the frame, as shown in FIG. 3. In one example, the shoulder 154 is configured to contact the pipe to inhibit the sharpened portion 152 of the scoring wheel 150 from cutting completely through the pipe. For instance, in one example, a distance between a tip of the sharpened portion 152 and the shoulder 154 is less than a thickness of the pipe, such that the sharpened portion 152 is constrained from cutting completely through the pipe by contacting of the shoulder 154 with the pipe. In one method of operation, the scoring wheel 150 functions to begin a split in the pipe, without being too aggressive about the split in the first wheel. In one embodiment, this provides an advantage where the splitting operation is performed more gradually, thereby requiring less pulling force as the splitter 100 is pulled through the old pipe. As shown, for example, in FIG. 7, other embodiments include multiple scoring wheels. In one embodiment, multiple scoring wheels are used with a progressive amount of scoring.

Figure 4:
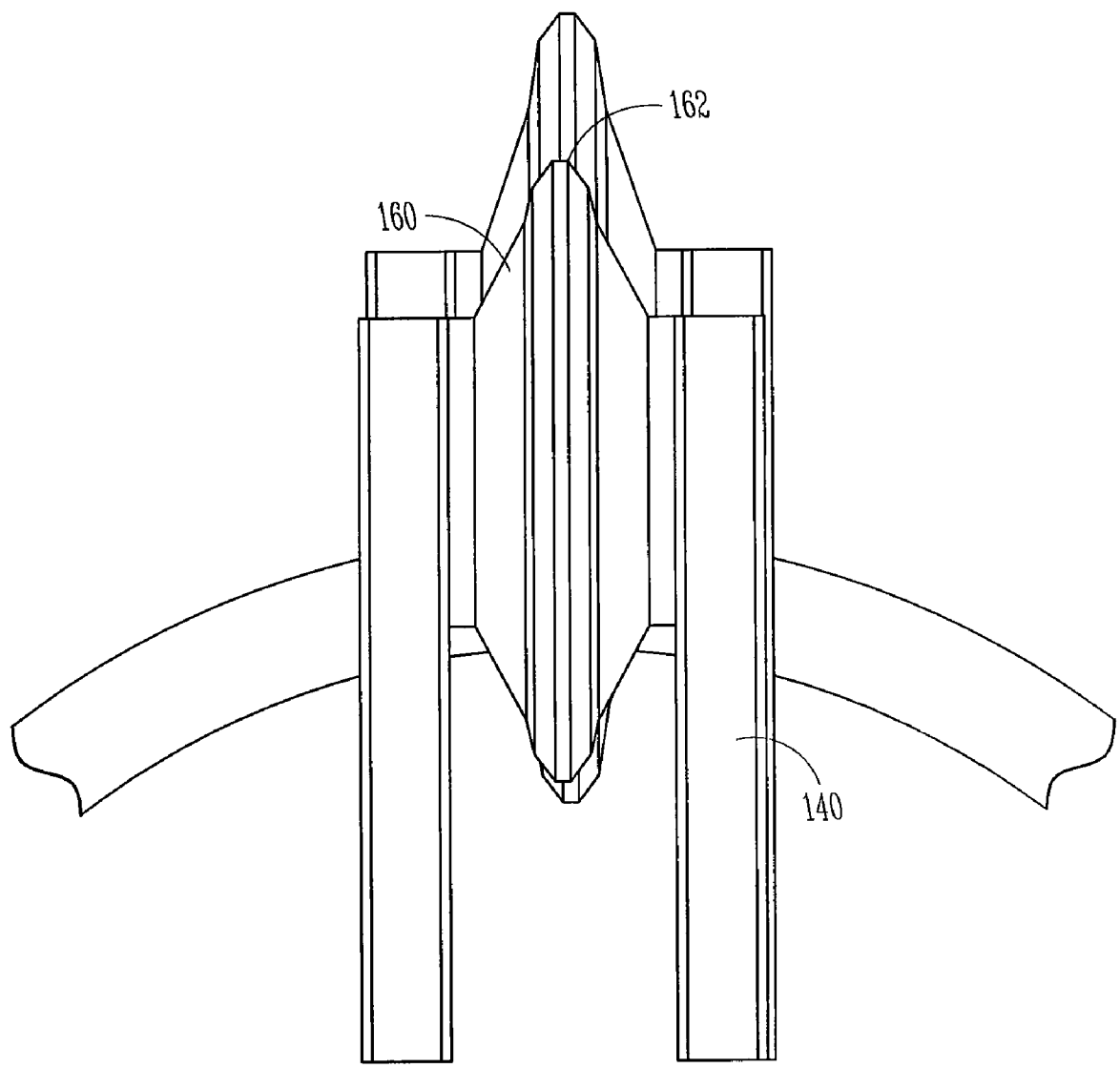
FIG. 4 shows a cross section view along line 4-4 of FIG. 2A according to an embodiment of the invention.
Figure 5:
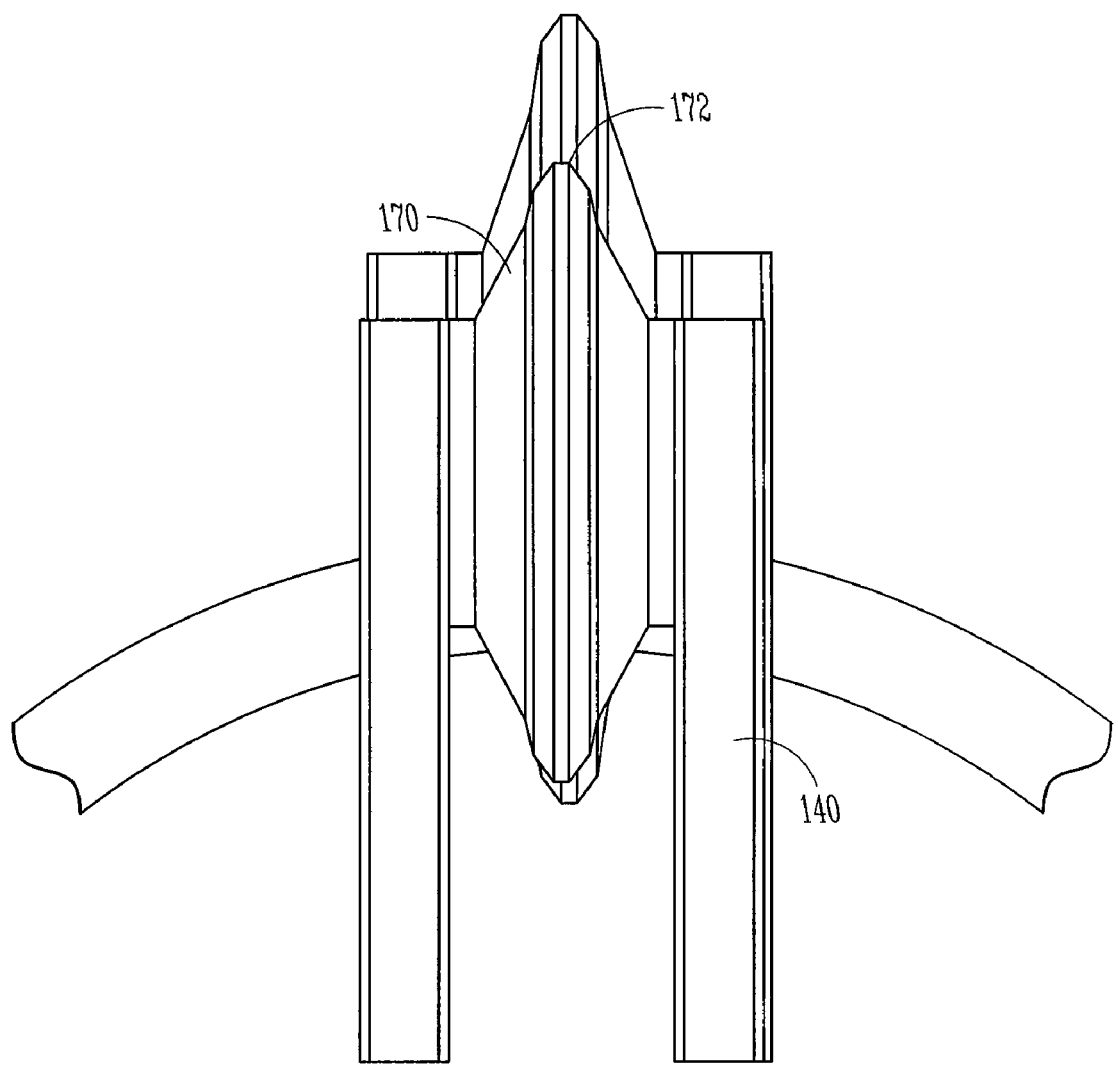
FIG. 5 shows a cross section view along line 5-5 of FIG. 2A according to an embodiment of the invention.

FIG. 4 shows a first cutting wheel 160. In one embodiment, a sharp cutting edge 162 is included, without any support portion or shoulder. FIG. 5 shows a second cutting wheel 170. In one embodiment, a sharp cutting edge 172 is included, without any support portion or shoulder, similar to cutting wheel 160. In one embodiment, the second cutting wheel 170 is substantially the same diameter as the first cutting wheel 160.

Figure 6:
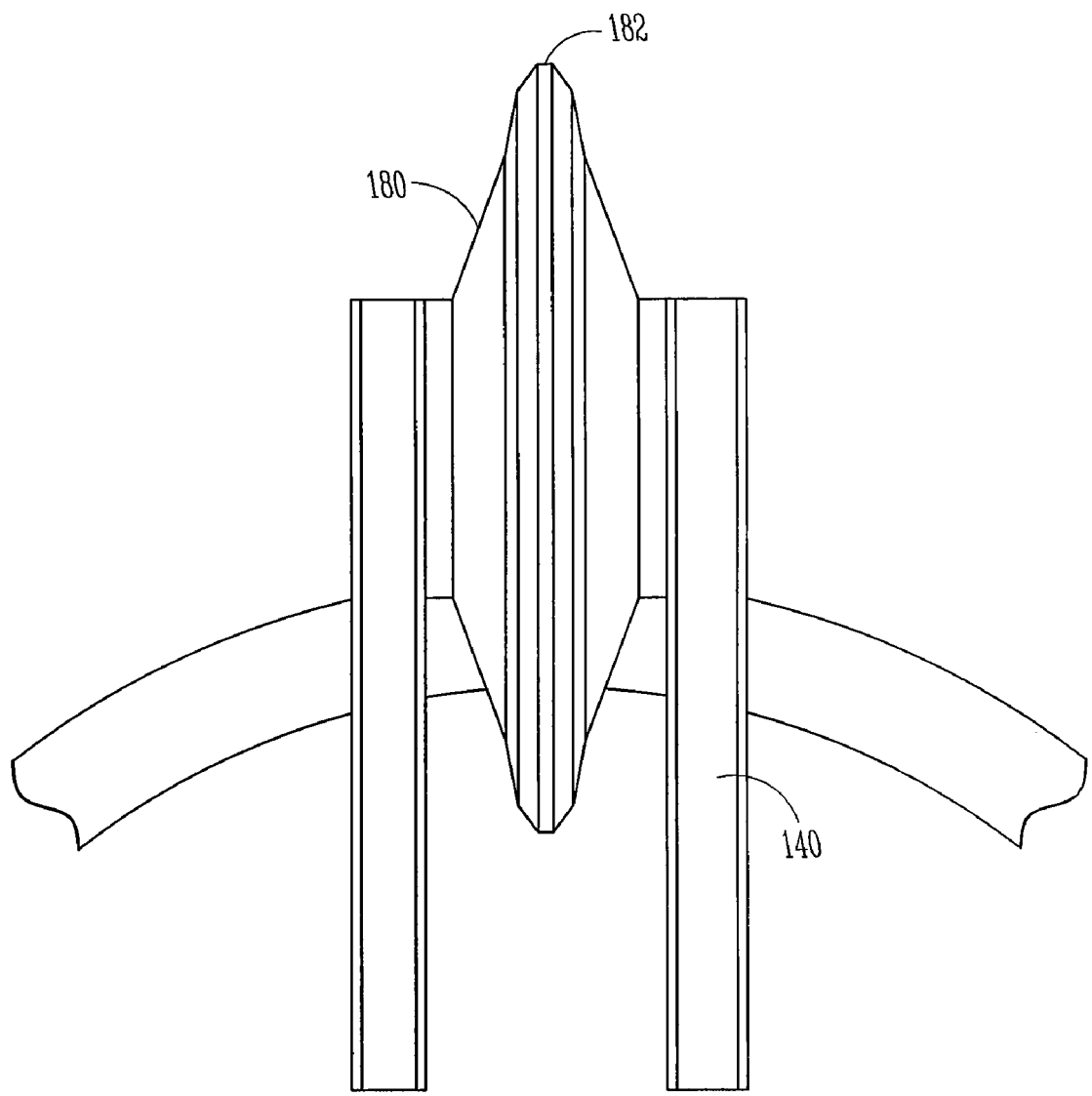
FIG. 6 shows a cross section view along line 6-6 of FIG. 2A according to an embodiment of the invention.

FIG. 6 shows a third cutting wheel 180. In one embodiment, a sharp cutting edge 182 is included, without any support portion or shoulder, similar to cutting wheels 160 and 170. In one embodiment, the diameter of the third cutting wheel 180 is larger than the diameter of the first cutting wheel 160 and the second cutting wheel 170.

In one embodiment, a diameter of each wheel such as cutting wheel 160, and the presence or absence of a support portion as in scoring wheel 150 determine an amount of cutting or scoring that each wheel performs. By selecting a combination of wheels including a scoring wheel or scoring wheels and various diameters of wheels, a progressive splitting operation is performed with lower pulling force. A clean split results using embodiments described in the present disclosure, which not only reduces the pulling force, but also makes the pulling force more consistent.

In one embodiment, use of long, consistent profile skid structures 130 further provides a consistent pulling force. This is in contrast to a device such as a guide roller that provides a more local force against a small portion of a side of the pipe.

CONCLUSION

Embodiments of pipe splitters as described above have a number of advantages. Using at least one scoring wheel, as shown in selected embodiments above, allows a more progressive cut that provides consistency in the split of the pipe, and reduces pulling force in the splitting operation. Another advantage includes the use of skid structures with a long and consistent profile. The skid structures are inexpensive to manufacture, and help to distribute forces from the pipe during a splitting operation over a larger surface area than a guide roller. However, a ribbed skid structure configuration keeps an amount of surface area in contact with a side of the pipe to a selected amount. Too much surface area in contact with a side of the pipe can also produce high friction.

While a number of advantages of embodiments of the invention are described, the above lists are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

I claim:

1. A method of pipe splitting, comprising:
   placing a length of pulling material through an existing pipe;
   attaching a splitting frame to a distal end of the length of pulling material;
   scoring the inside of the existing pipe with a scoring wheel as the frame is pulled through the pipe to create a score line without cutting completely through the pipe, the scoring wheel defining a scoring axis and including a sharpened portion and a shoulder extending outwardly from the sharpened portion in a direction generally parallel to an axis of rotation of the scoring wheel, at least a portion of the shoulder extending outwardly from the frame, the shoulder configured to contact the pipe to inhibit the sharpened portion of the scoring wheel from cutting completely through the pipe; and
   cutting the pipe along the score line with at least one cutting wheel.

2. The method of claim 1, wherein placing a length of pulling material through an existing pipe includes placing a length of cable through an existing pipe.

3. The method of claim 1, wherein placing a length of pulling material through an existing pipe includes placing drill stem sections of a horizontal directional drill through an existing pipe.

4. The method of claim 1, wherein scoring the inside of the existing pipe includes scoring the inside of a ductile iron pipe.

5. The method of claim 1, wherein cutting the pipe includes cutting the pipe with multiple cutting wheels having progressively larger diameters.

6. The method of claim 1, wherein scoring the inside of the existing pipe includes scoring the inside of the pipe progressively deeper with multiple scoring wheels.

7. A method of pipe splitting, comprising:
   moving a splitting frame through an existing pipe;
   scoring the inside of the existing pipe with a scoring wheel as the frame is moved through the pipe to create a score line without cutting completely through the pipe, the scoring wheel defining a scoring axis and including a sharpened portion and a shoulder extending outwardly from the sharpened portion in a direction generally parallel to an axis of rotation of the scoring wheel, at least a portion of the shoulder extending outwardly from the frame, the shoulder configured to contact the pipe to inhibit the sharpened portion of the scoring wheel from cutting completely through the pipe; and
   cutting the pipe along the score line with at least one cutting wheel.

8. The method of claim 7, wherein scoring the inside of the existing pipe includes scoring the inside of a ductile iron pipe.

9. The method of claim 7, wherein cutting the pipe includes cutting the pipe with multiple cutting wheels having progressively larger diameters.

10. The method of claim 7, wherein scoring the inside of the existing pipe includes scoring the inside of the pipe progressively deeper with multiple scoring wheels.

11. The method of claim 7, wherein moving the splitting frame includes sliding the frame through the pipe along a skid structure of the frame.

12. The method of claim 7, wherein moving the splitting frame includes pulling the frame through the pipe using a cable.

13. A method of pipe splitting, comprising:
   moving a splitting frame through an existing pipe, the frame including a splined structure coupling an inner body to an outer body, the inner body configured to receive an applied pulling force to move the splitting frame through the existing pipe;
   scoring the inside of the existing pipe with a scoring wheel extending from the outer body as the frame is moved through the pipe to create a score line without cutting completely through the pipe; and
   cutting the pipe along the score line with at least one cutting wheel extending from the outer body.

14. The method of claim 13, wherein cutting the pipe includes cutting the pipe with multiple cutting wheels having progressively larger diameters.

15. The method of claim 13, wherein scoring the inside of the existing pipe includes scoring the inside of the pipe progressively deeper with multiple scoring wheels.

16. The method of claim 13, wherein moving the splitting frame includes sliding the frame through the pipe along a skid structure protruding from the outer body of the frame.

17. The method of claim 13, wherein moving the splitting frame includes pulling the frame through the pipe using a cable coupled to the inner body to apply the pulling force.

18. The method of claim 13, wherein scoring the inside of the existing pipe includes using the scoring wheel defining a scoring axis and including a sharpened portion and a shoulder extending outwardly from the sharpened portion in a direction generally parallel to an axis of rotation of the scoring wheel, at least a portion of the shoulder extending outwardly from the frame, the shoulder configured to contact the pipe to inhibit the sharpened portion of the scoring wheel from cutting completely through the pipe.

* * * * *